United States Patent [19]
Mayfield et al.

[11] Patent Number: 5,355,778
[45] Date of Patent: Oct. 18, 1994

[54] HANDHELD, ROTATABLE FOOD ROASTING APPARATUS

[76] Inventors: Alfred B. Mayfield, RR 2, Box 93, Halstead, Kans. 67056; Sanford Nikkel, Rte. 1, Box 117, Moundridge, Kans. 67107

[21] Appl. No.: 959,110

[22] Filed: Oct. 9, 1992

[51] Int. Cl.$^5$ .............................................. A47J 43/18
[52] U.S. Cl. ........................................ 99/441; 99/394; 99/421 A; 220/485; 220/493
[58] Field of Search ............... 99/394, 419, 421 A, 99/426, 427, 440, 441; 294/864.2; 15/144.1; 220/485, 491, 493, 494; 206/446

[56] References Cited

U.S. PATENT DOCUMENTS

| D. 231,891 | 6/1975 | Di Pirro | 99/441 |
| D. 241,110 | 8/1976 | Oedekerk | 99/426 |
| 1,755,646 | 4/1930 | Halstead | 99/419 |
| 2,136,658 | 11/1938 | Westberg | 99/427 |
| 2,189,047 | 2/1940 | Tolen | 99/441 |
| 2,514,281 | 7/1950 | Hobbs | 99/441 |
| 2,756,912 | 7/1956 | Armstrong | 220/493 |
| 2,804,819 | 9/1957 | Whealton | 99/441 |
| 2,909,987 | 10/1959 | Crites | 99/419 |
| 3,357,035 | 12/1967 | Ficke | 15/144.1 |
| 3,433,151 | 3/1969 | Farran | 99/441 |
| 3,927,609 | 12/1975 | Scott | 99/419 |
| 3,955,487 | 5/1976 | Chetta, Jr. | 99/441 |
| 4,077,514 | 3/1978 | Kubokawa | 220/485 |
| 4,380,192 | 4/1983 | Doren | 99/441 |

FOREIGN PATENT DOCUMENTS

| 0049181 | 9/1940 | Netherlands | 220/485 |
| 0019656 | of 1915 | United Kingdom | 220/493 |

Primary Examiner—David A. Scherbel
Assistant Examiner—Randall E. Chin
Attorney, Agent, or Firm—Hovey, Williams, Timmone & Collins

[57] ABSTRACT

A handheld, rotatable food roasting apparatus for use in supporting food over a campfire or the like includes a cylindrical receptacle including opposed axial ends, an open interior space, and an opening formed in one of the axial ends through which food may be placed into and removed from the interior space. An elongated handle is attached to the receptacle for allowing the apparatus to be supported and rotated over the source of heat. In order to facilitate transportation of the device, the handle may be sectioned.

4 Claims, 1 Drawing Sheet

HANDHELD, ROTATABLE FOOD ROASTING APPARATUS

BACKGROUND OF THE INVENTION

1. Field of the Invention

The present invention relates generally to cooking utensils and, more particularly, to an apparatus for supporting food over a source of heat, such as a campfire, burning coals or the like.

2. Discussion of the Prior Art

Traditionally, a stick or fork is used by campers for supporting a hot dog, sausage, or the like over a campfire during cooking. One end of the stick or fork is normally sharpened and pushed through one or more hot dogs, and is then hand-held with the hot dogs positioned immediately over the fire so that the heat of the fire cooks the hot dogs.

One shortcoming to the use of sticks or forks for this purpose is that the hot dogs sometimes fall from the stick during cooking, or brush against the burning logs or coals, thus contaminating the meat. Additionally, penetration of the meat causes it to dry during cooking, and the cooker must use their fingers to manipulate the hot dog before and after cooking. Additionally it is difficult to evenly rotate a hot dog or sausage over an open flame so as to cook all around them equally well. Likewise when trying to cook on sticks or forks with two or more prongs, it becomes increasingly hard to cook two or more hot dogs evenly. A further drawback to a stick or fork is the danger of the user, especially children poking one another in the eye or body with their points.

OBJECT AND SUMMARY OF THE INVENTION

It is an object of the present invention to provide an apparatus which overcomes the problems experienced with conventional methods and devices, and which may be used in cooking any of a number of different types of foods over an open fire or any other heat source. A further object is to allow the user to cook one or more food objects even a half dozen or more within the cooking receptacle with a gentle rolling action applied to each and every food item such as hot dogs. A further object of the instant invention is to provide a cooking device for use over heat sources, such as campfires, which is safer to use then conventional forks or sticks in that it eliminates the danger of the user poking or being poked by the sharp point of the stick or fork.

In accordance with this and other objects evident from the following description of a preferred embodiment of the invention, a roasting apparatus comprises a rotatable cylindrical receptacle including opposed axial ends, an open interior space, and an opening formed in one of the axial ends through which food may be placed into and removed from the interior space. The receptacle is formed of fire proof heat conductive material, and an elongated handle is provided by which the apparatus may be supported over the source of heat. The handle is affixed to the end of the receptacle opposite the opening, thus allowing the user to rotate the entire device about its axis in either direction.

Thus, an apparatus is provided which retains a food item and supports the item for cooking over a source of heat, while allowing the cooker to maintain control of the position of the food item over the heat source in order to evenly cook the item. In accordance with one aspect of the invention, the receptacle is formed with a plurality of openings which permit the cooker to constantly observe the food item during cooking, while allowing heat to contact the food item directly.

According to another aspect of the invention, the handle is divided into sections which may be broken down for transportation so that the device may be stored in a backpack or the like.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
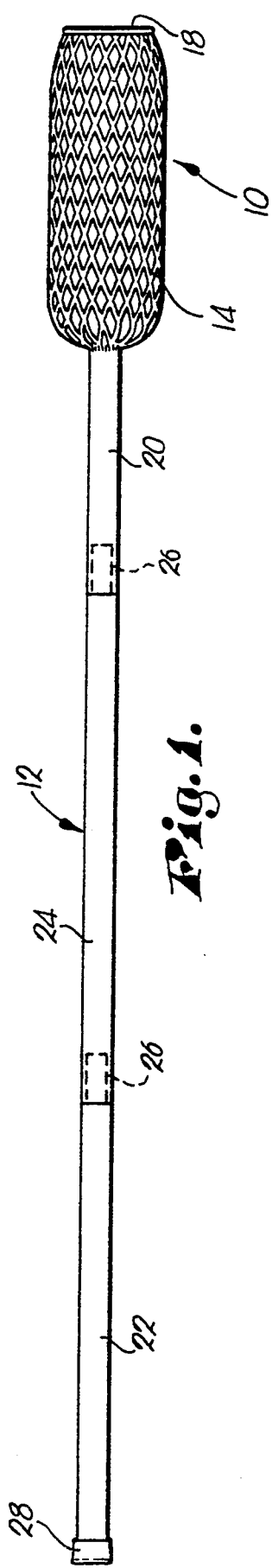
FIG. 1 is a side elevational view of a roasting apparatus constructed in accordance with the preferred embodiment.

A food roasting apparatus constructed in accordance with the preferred embodiment of the invention is illustrated in FIG. 1, and generally includes a receptacle 10 and a handle 12.

Figure 2:
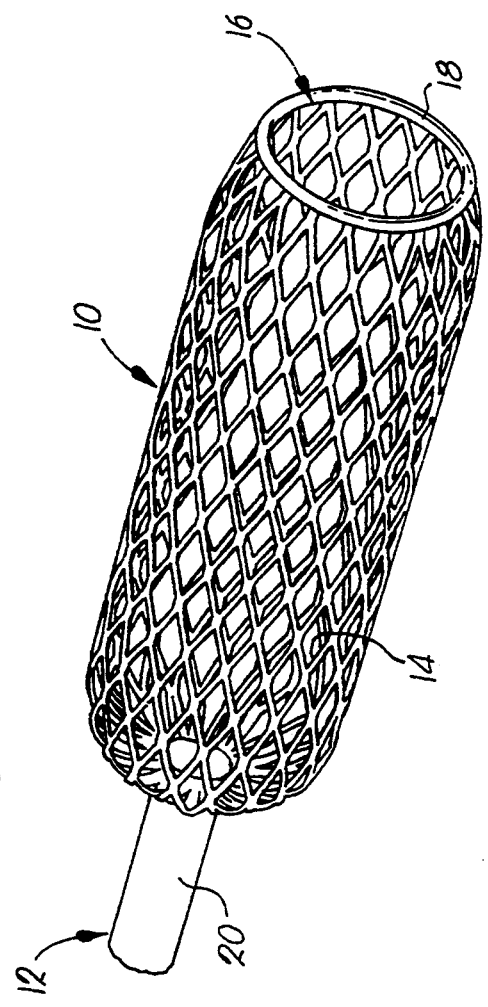
FIG. 2 is a fragmentary perspective view of the receptacle of the apparatus.

The receptacle 10 is illustrated in FIG. 2, and includes a cylindrical receptacle wall formed of a sheet of expanded metal that has been rolled into a cylindrical shape.

It is noted that the receptacle wall could be formed of any material capable of supporting food items within the receptacle while withstanding cooking temperatures experienced over campfires, burning coals or the like. Preferably, the wall includes a plurality of small openings 14 which permit visual inspection of the food item within the receptacle during cooking. As mentioned, the provision of these openings 14 permits a cooker to monitor cooking of the item.

Figure 3:
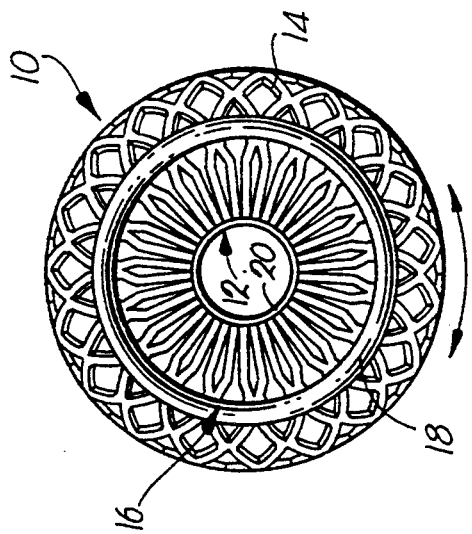
FIG. 3 is a front elevational view of the apparatus.

Turning to FIG. 3, it can be seen that one end of the receptacle is closed, and that this end is formed by folding the expanded metal of the cylindrical wall inward, and welding the wall material to an end of the handle 12. The axial end of the receptacle opposite the closed end is provided with an opening 16 through which food may be placed into and removed from the interior space defined within the cylindrical wall.

The expanded metal of the cylindrical wall is curved inward slightly at the opening 16 so that the diameter of the cylindrical wall of the receptacle is greater than the diameter defined by the opening 16. By providing this construction, the end of the receptacle in which the opening is formed is partially closed to inhibit food from falling out of the interior space through the opening. An annular rim 18 is preferably provided at the opening and is welded to the expanded metal material of the receptacle 10 in order to reinforce the receptacle and to provide a smooth edge so that a user is protected against the uneven edge normally presented by the expanded metal material.

Returning to FIG. 1, the handle 12 is illustrated as being sectioned, including a proximal section 20 and a distal section 22, the two being separated from one another by an intermediate section 24. As mentioned, the proximal section 20 is welded to the receptacle 10.

Preferably, the distal and intermediate handle sections 22, 24 each include a projection 26 on one axial end thereof having a reduced diameter adapted to fit within the end of an adjacent section. The projections 26 may be tapered, swaged, threaded, or otherwise machined to permit the sections to be assembled and secured together for use, while allowing the handle to be broken down into the sections for storage and transportation. As shown in the figure, an end cap 28 may be provided on the distal handle section 22.

In the preferred embodiment the handle sections 20, 22, 24 are hollow, and are made from metal or any other material capable of withstanding conventional cooking temperatures.

By constructing a roasting apparatus in accordance with the preferred embodiment numerous advantages are realized. For example, because the apparatus does not require the food item to be skewered, the apparatus may be used with numerous different types of items with which conventional cooking utensils are not useful. Specifically, the apparatus may be used to cook, by rolling action, hot dogs and other meats, corn, marshmallows, fish, tamales, burritos, enchiladas, or any other food to be cooked which is of a size capable of being retained within the receptacle.

Although the invention has been described with reference to the preferred embodiment illustrated in the attached drawing figures, it is understood that substitutions may be made and equivalents employed herein without departing from the scope of the invention as recited in the claims. For example, the handle may be formed of a unitary piece of material, or may be provided with sections that are held together for telescopic receipt within adjacent sections.

What is claimed is:

1. A handheld, rotatable food roasting apparatus for use in supporting food over a source of heat, the apparatus comprising:

a cylindrical receptacle formed of expanded metal and including opposed axial ends, an open interior space, and an opening formed in one of the axial ends through which food may be placed into and removed from the interior space, the cylindrical shape of the receptacle defining a diameter which is greater than the diameter defined by the opening so that the end of the receptacle in which the opening is formed is partially closed to inhibit food from falling out of the interior space through the opening; and an elongated handle by which the apparatus may be rotatably supported over the source of heat, the handle being affixed to the end of the receptacle opposite the opening.

2. A food roasting apparatus as described in claim 1, sized for cooking one or a plurality of a wide range of foods including hot dogs, wieners, sausages, ear corn, tamales, enchiladas, burritos, flautas, marshmallows, and warming buns.

3. A food roasting apparatus as described in claim 1, shaped for cooking over a wide range of heat sources, including campfires, fireplaces, open-front stoves or ovens, gas burners, charcoal and electric stoves.

4. A food roasting apparatus as recited in claim 1, further comprising an annular rim connected to the expanded metal of the receptacle around the opening.

* * * * *